United States Patent [19]

Bakula

[11] Patent Number: 4,663,971
[45] Date of Patent: May 12, 1987

[54] STATIC WHEEL BALANCER

[75] Inventor: Jerry R. Bakula, Kenosha, Wis.

[73] Assignee: Snap-on-Tools Corporation, Kenosha, Wis.

[21] Appl. No.: 730,586

[22] Filed: May 6, 1985

[51] Int. Cl.$^4$ ............................................. G01M 1/12
[52] U.S. Cl. ...................................................... 73/480
[58] Field of Search .......................... 73/480, 481, 487

[56] References Cited

U.S. PATENT DOCUMENTS

| | | |
|---|---|---|
| 1,977,297 | 10/1934 | Weaver . |
| 2,613,532 | 10/1952 | Jones ..................................... 73/487 |
| 2,613,533 | 10/1952 | Jones . |
| 2,738,680 | 3/1956 | Bejeuhr ................................. 73/480 |
| 2,752,788 | 7/1956 | La Penta ............................... 73/480 |
| 3,139,757 | 7/1964 | Egbert ................................... 73/480 |
| 3,177,725 | 4/1965 | Johnson . |
| 4,336,716 | 6/1982 | Poppell . |

FOREIGN PATENT DOCUMENTS 66964 11/1957 France .
513088 2/1955 Italy .
197557 5/1923 United Kingdom .

OTHER PUBLICATIONS

Instruction Manual on Snap-on Wheel Balancer, Model No. WBK2C.

Primary Examiner—Stewart J. Levy
Assistant Examiner—John E. Chapman, Jr.
Attorney, Agent, or Firm—Emrich & Dithmar

[57] ABSTRACT

The wheel balancer includes a plastic one-piece body for mounting on the shaft of a wheel and also having a window. A bar is carried by the body and is slidable therein to a position where the wheel is in balance, whereupon indicia on the bar, visible through the window, informs the mechanic how much weight is to be added to the wheel to place it in balance. The bar is also rotatable about its axis, in the body, so that several labels corresponding to several wheel diameters can be provided on the same bar. A detent mechanism on the body and on the bar holds the bar in a selected rotational orientation while enabling the sliding movement during balancing.

9 Claims, 12 Drawing Figures

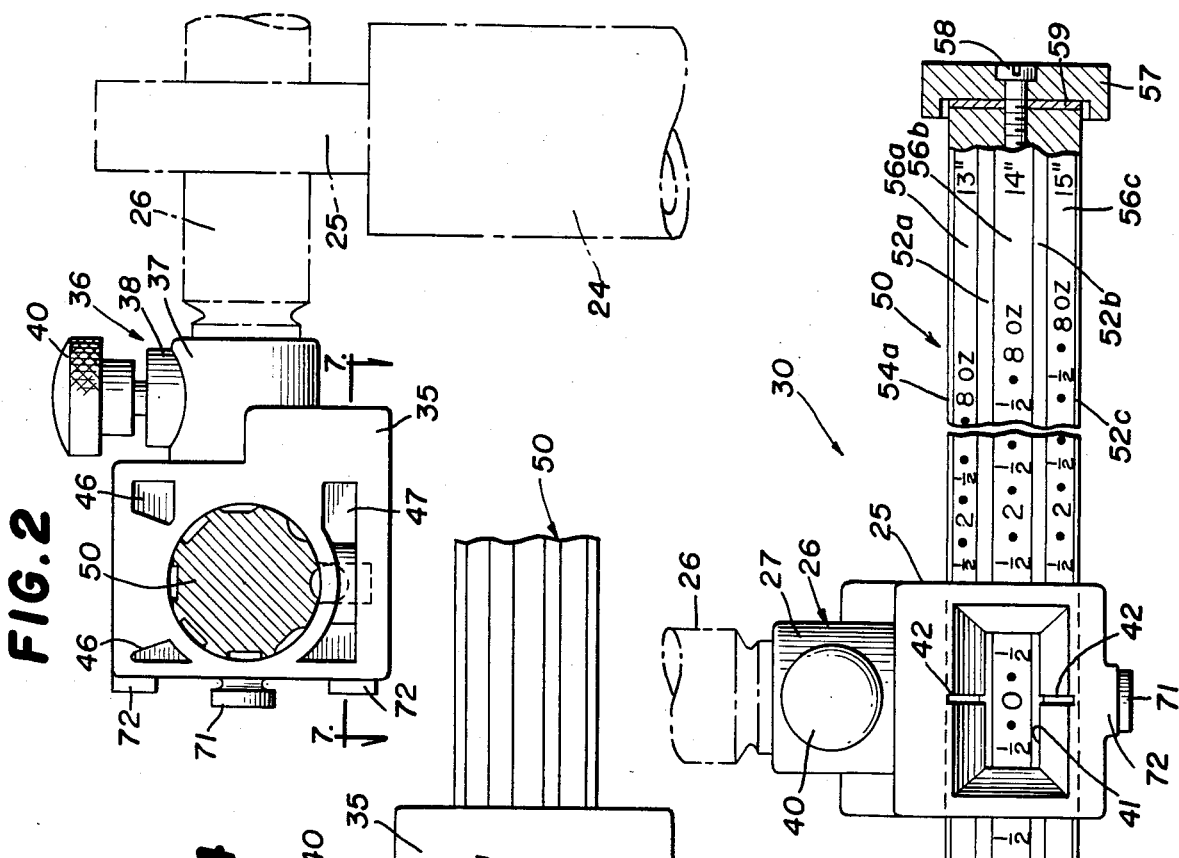

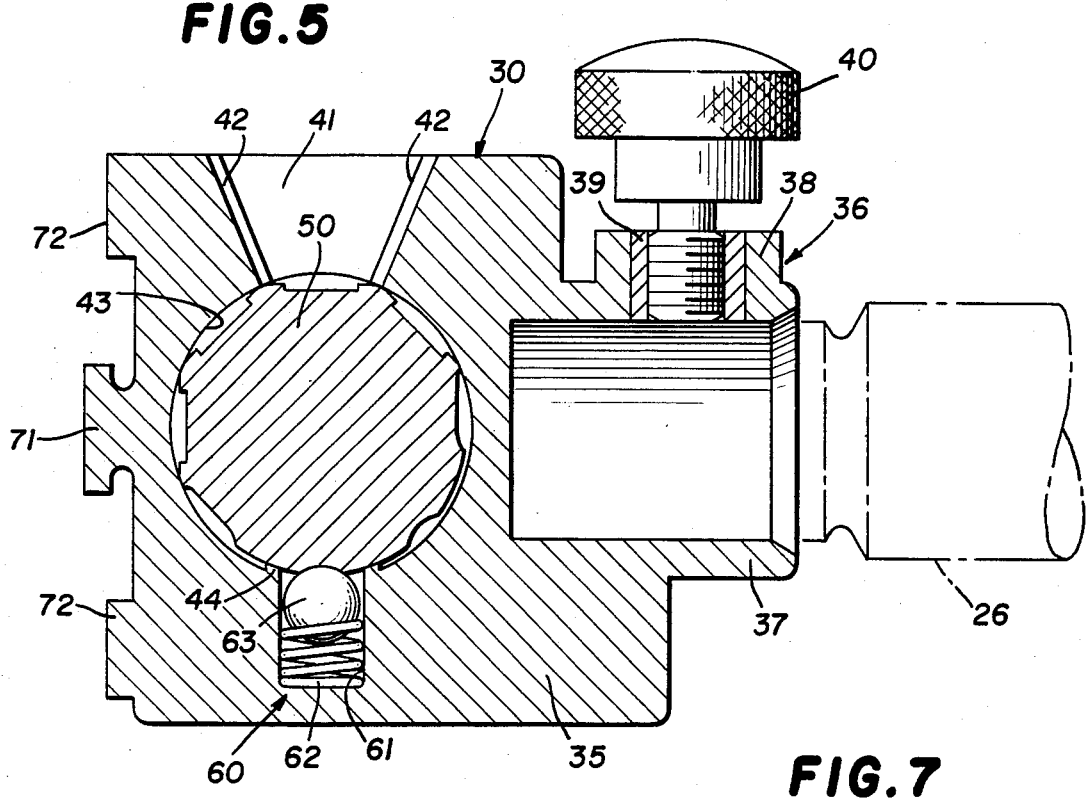
FIG. 5
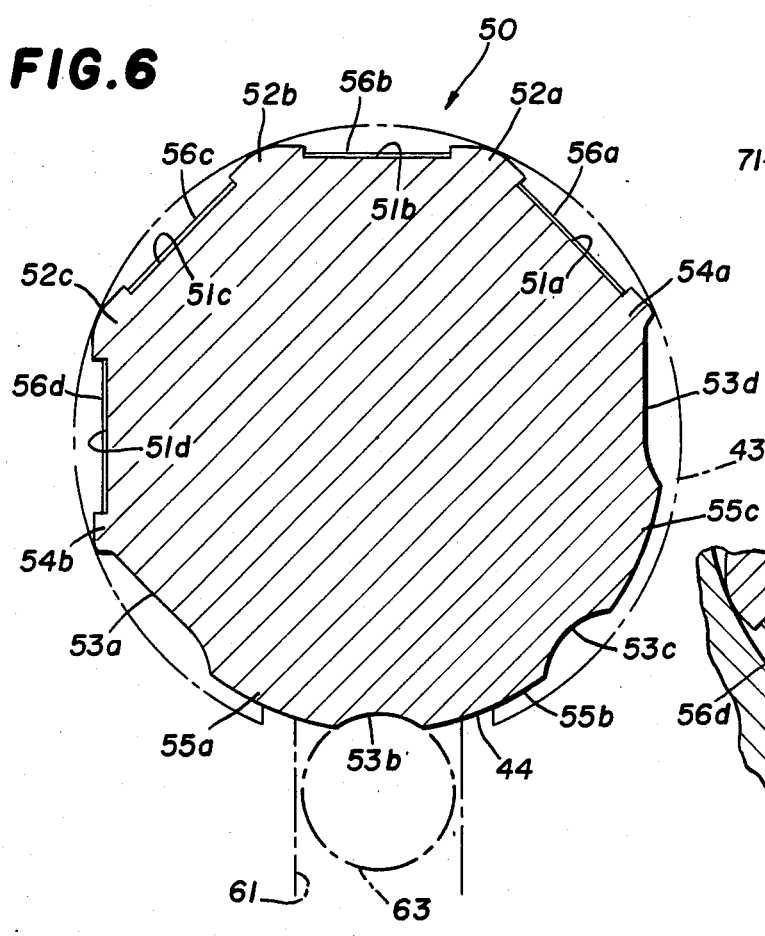
FIG. 6
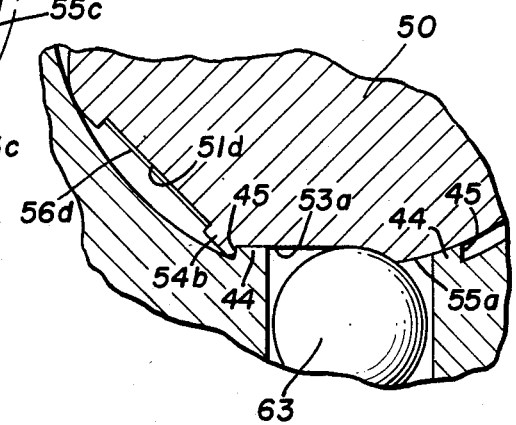
FIG. 7
FIG. 8

STATIC WHEEL BALANCER

BACKGROUND OF THE INVENTION

This invention relates to static wheel balancers generally and specifically to the kind of static wheel balancer that is applied to a wheel which has been removed from the vehicle and is mounted on a stand in such a way as to be rotatable about a horizontal shaft.

The wheel balancer includes a weight which is moved to a position and orientation relative to the wheel, signifying the amount and location of weights to be permanently attached to the wheel to achieve balance of a previously unbalanced wheel. One such prior art wheel balancer has been sold by the assignee of the present application under its Model No. WBK 2C. That wheel balancer includes two parallel rods, one bearing indicia representing weights and the other defining a track for a movable weight. The track carries mounting structure for attachment to the shaft. While this product is satisfactory for use in balancing wheels, it is heavier, more cumbersome, more complicated, less accurate and more expensive to manufacture, than desired.

SUMMARY OF THE INVENTION

It is therefore an important object of the present invention to provide an improved wheel balancer for use in balancing wheels off the vehicle.

Another object is to provide an improved wheel balancer which is lighter, more accurate, less expensive to manufacture and easier to use than those currently known.

Another object is to provide a wheel balancer which includes a single arm which itself constitutes a movable weight.

In summary, there is provided a wheel balancer for use in balancing a wheel, the wheel balancer comprising a body, means on the body for mounting to the wheel, means on the body defining a window, and a bar including longitudinally spaced apart indicia representing weights to be added to the wheel, the bar being slidably mounted in the body such that the indicia are visible through the window.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 illustrates a wheel balancing apparatus which includes a wheel balancer incorporating features of the present invention;

FIG. 2 is an enlarged view in vertical section taken along the line 2—2 of FIG. 1, with portions of the stand and the shaft being shown in phantom;

FIG. 2 is an enlarged, fragmentary view in horizontal section taken along the line 3—3 of FIG. 1, with a portion of the shaft shown in phantom;

FIG. 4 is an enlarged view of that shown in the circle marked "4" in FIG. 1;

FIG. 5 is an enlarged view in vertical section taken along the line 5—5 of FIG. 4;

FIG. 6 is an enlarged transverse sectional view of the bar;

FIG. 7 is a view in section taken along the line 7—7 of FIG. 2;

FIG. 8 is an enlarged fragmentary, sectional view depicting one of the stop walls of the bar engaging the shoulder of the body;

DESCRIPTION OF THE PREFERRED EMBODIMENT

Figure 9:
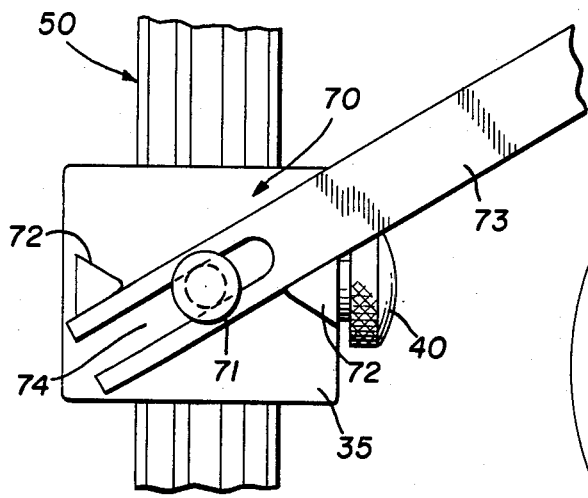
FIG. 9 depicts a fragmentary portion of the locating arm in position on the wheel balancer body.

Turning now to the drawings and more particularly to FIG. 1 thereof, there is depicted a tire 10 mounted on a wheel 11 which has an outer flange 12. As is well known, such wheel/tire combinations tend to be out of balance. In other words, there is greater effective weight at one point on the circumference of the tire than at other points. This tends to make the combination unsafe, to produce an unsatisfactory driving and riding condition, and to make the tread on the tire wear more quickly. It is common practice, therefore, to balance the wheel/tire combination by adding one or more weights to the flange 12.

There is provided a wheel balancing assembly 20 which the mechanic uses to locate the weights on the flange 12. The wheel balancing assembly includes a stand 21 having a plastic base 22 carried by a set of four casters 23. A pair of upstanding posts 24 (one is shown) on the base 22 are spaced apart a distance greater than the width of the wheel/tire combination to be balanced thereon. At the top of each post is a bearing 24 (FIG. 2). The wheel with the tire mounted thereon is removed from the vehicle and a shaft 26 (FIG. 2) is attached to the wheel 11 in a manner so as to be securely centrally located with respect to the axis of the wheel/tire combination. The protruding ends of the shaft 26 are respectively carried by the bearings 25.

The wheel balancing assembly 20 also includes a wheel balancer 30 incorporating features of the present invention. Referring to FIGS. 2 and 3, the wheel balancer 30 comprises a one-piece, plastic body 35. Mounting structure 36, which is part of the body 35, is defined by a tubular extension 37 having an inside diameter substantially matching the diameter of the ends of the shaft 26. A boss 38 on the extension 37 has a radially extending bore in which is nonrotatably attached a threaded insert 39 (FIG. 5). A thumb screw 40 having a knurled head is threaded into the insert 39. The thumb screw 40 is tightened so as to hold the body 35 onto the shaft 26.

The body includes a generally rectangular window having aligned grooves 42 adjacent thereto. These grooves are preferably pointed to define a line or a pointer for purposes which will be described. Referring to FIGS. 5 and 6, the body 35 has a through-hole 43 therein which is basically circular. However, in the portion of the hole directly opposite the window 41 is a shoulder 44 which has an extent on the order of about 45° in the embodiment shown. The inner surface of the shoulder is part cylindrical, having a radius of curvature slightly less than the radius of curvature of the rest of the through-hole 43. The sides of the shoulder 44 are substantially parallel, although that is not necessary and define abutment surfaces 45 (FIG. 8). The body 35 has voids 46 and 47 (FIGS. 2 and 7) for material-saving purposes.

Referring to FIGS. 3, 5 and 6, the wheel balancer 30 includes a bar 50 extending through the hole 43. The bar includes a set of four longitudinally extending, flat bottom facets 51a-d. A ridge 52a separates the facets 51a, b, a ridge 52b separates the facets 51b, c and a ridge 52c separates the facets 51c, d. Each of the ridges 52a-c has a curved outer surface, the distance from the axis of the bar 50 to the outermost surface of each of the ridges 52a-c is generally equal to the inside radius of the through hole 43. However, in the embodiment shown, the curvature of each of the ridges is not the same as the curvature of the hole 43 so that only part surface contact occurs. Opposite the four facets 51a-d respectively are four longitudinally extending grooves 53a-d. The two interior grooves 53b and 53c are part cylindrical. The outer grooves 53a and 53d have a part-cylindrical portion (approximately 45°) and the rest of each of such grooves is flat. A longitudinally extending wall 54a is located between the facet 51a and the groove 53d, and a wall 54b is located between the facet 51d and the groove 53a. Ridges 55a-c respectively separate the grooves 53a-d. Each of the ridges 55a-c has a part-cylindrical outer surface, the radius of curvature of which is slightly less than and therefore spaced from, the surface of the through hole 43.

The wheel balancer 30 includes four elongated labels, three of which, 56a-c, are depicted in FIG. 3. The three labels 56a-c are respectively affixed to the facets 51a-c. The fourth label (not shown) is affixed to the facet 51d. The label 56a bears the indication "12''''" on the left end and the designation "13''''" on the right end, together with numbers corresponding to weights in ounces up to eight, in half-ounce increments and indicia marks representing weights in quarter-ounce increments. For simplicity of illustration, all the numbers do not appear. The label 56b has a designation "14''''" at each end, and also numbers up to eight, in half-ounce increments. Finally, the label 56c bears the indication "15''''" on each end. The designations "12", "13", "14" and "15" correspond to different wheel diameters, as will be explained. At each end of the bar 50 is a cap 57 held in place by a screw 58. One or more shims 59 may be inserted between either or both caps 57 and the corresponding end or ends of the bar 50 to produce proper weight and balance.

The wheel balancer 30 further comprises a detent mechanism 60, best seen in FIG. 5. A radially extending bore 61 is provided in the body 35 and communicates with the hole 43. The mouth of the bore 61 is in the shoulder 44. A spring 62 in the bore 61 biases a ball 63, also in the bore 61, toward the axis of the hole 43. The detent mechanism 60 also includes the grooves 53a-d in the bar 50.

The bar 50 is slidably located in the through hole 43 of the body 35. In FIG. 6, the phantom circle represents the surface of the hole 43. The surfaces of the walls 54a, b and the ridges 52a-c contact such inside surface, and the curved surface of the shoulder 44 contacts the outer surfaces of the ridges 55a-c, depending on orientation. Thus, the bar 50 is laterally restrained against lateral movement. Yet, the bar can be axially slid with respect to the body 35 while the surfaces are in sliding contact.

The mechanic rotates the bar 50 until the label containing the appropriate wheel diameter is aligned with the window 41. In other words, if he wants to balance a wheel having a fourteen-inch diameter, he would rotate the bar 50 until the label 56b is aligned with the window 41, as depicted in FIG. 3.

The detent mechanism 60 allows the bar 50 to be rotated in the body 35 to expose a portion of a selected one of the four labels through the window 41 and at the same time to enable the bar to be slid through the body 35. The ball 63 is biased, by the spring 62, against the bar 50. The ball 63 is located directly opposite the window 41, so that when a selected one of the four labels is visible through the window 41, the ball 63 is located in the associated one of the grooves 53a-d. For example, referring to FIG. 6, when the label 56b is aligned with the window 41, the associated groove 53b is located directly above the ball 63, and the ball 63 is located therein. The bar 50 can be slid back and forth to expose different indicia on the label 56b in the window 41 while the ball 63 resides in the groove 53b, to retain the bar at the selected orientation. When the wheels are in balance, the grooves 42 in the window 41 are aligned with some number, say "4", signifying that four ounces of weight would have to be added to the flange 12 of the wheel 11. Further details on this will be described.

If the wheel diameter is fifteen inches, then the bar 50 would be rotated until the label 56c became aligned with the window 41. The ball 63 snaps into the groove 53c and the bar can be slid therealong.

If the wheel to be balanced has a thirteen-inch diameter, then the bar 50 would be rotated until the label 56a is aligned with the window 41. It is noted that this label has information for a thirteen-inch wheel on the right side of the label and information for a twelve-inch wheel on the left side. Thus, if the wheel diameter is thirteen inches, he would follow the steps described above but would move the bar 50 to the left so that indicia on the right would be visible in the window 41. The thirteen-inch end would be placed adjacent the heavy spot on the wheel-tire combination. If, on the other hand, the wheel has a twelve-inch diameter, then the bar would be moved to the right so that the indicia on the left part of the label would be visible. The twelve-inch end would be placed adjacent the heavy spot on the wheel-tire combination. With the label 56a aligned with the window 41, the groove 53a would receive the ball 63.

Actually, only one part of the groove 53a is cylindrical (approximately 45°) and that is tha part that receives the ball 63. This can more readily be seen in FIG. 8. Note that the wall 54b abuts against the abutment surface 45 on the shoulder 44. This structure precludes further counterclockwise rotation of the bar 50. If the fourth label (not shown) in the facet 51d, which would be for a sixteen-inch wheel, is aligned with the window 41, then the part-cylindrical portion of the groove 53d would receive the ball 63, while the wall 54a would be disposed against the abutment surface 45 on the right side of the shoulder 44, thereby precluding further clockwise rotation of the bar 50. Whichever one of the grooves 53a-d receives the ball 63, sliding movement of the bar 50 within the body 35 is accommodated.

In one form of the invention, the labels were made of polyester with a metalized background and had self-stick adhesive. The bar 50 in such actual form was made of extruded aluminum.

Referring to FIGS. 4 and 9, the weight-locating structure 70 will be described. It includes a headed stud 71 protruding from and integral with the body 35 on the wall thereof opposite to the extension 37. On the same wall, above and below the headed stud 71 is a pair of triangular shaped stops 72, both pointing toward the headed stud 71. An arm 73 thirteen to fourteen inches in length has a bifurcated end 74 that can be slipped onto the necked down portion of the headed stud 71 as shown in FIG. 9. The arm 73 is allowed to rest on one of the stops 72.

Figure 10:
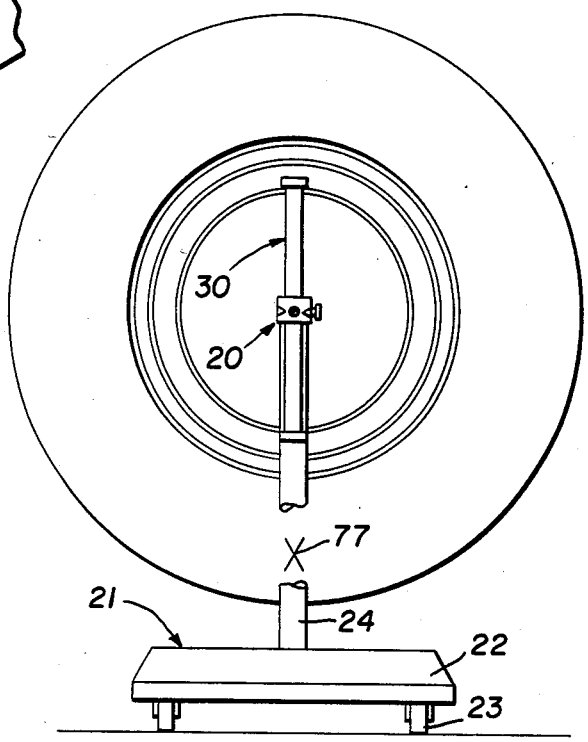
FIG. 10 is a schematic view of the wheel balancing assembly in one condition.
Figure 11:
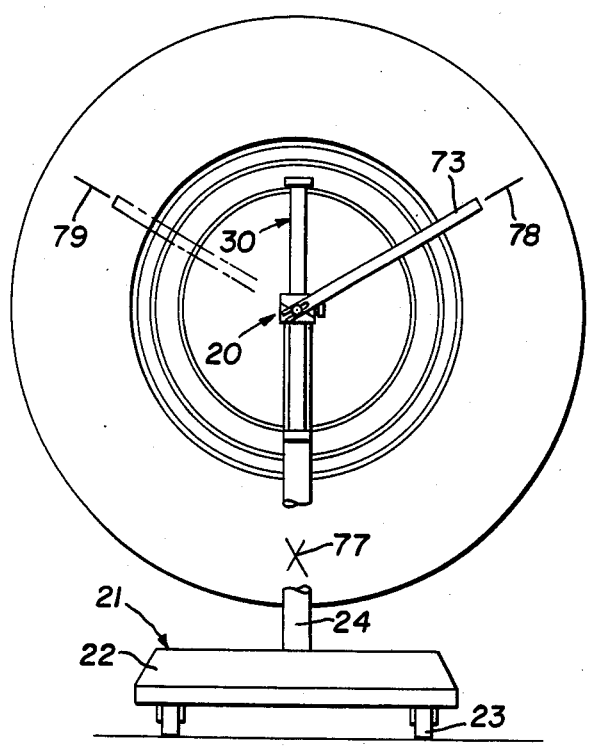
FIG. 11 depicts the wheel balancing assembly in a second condition.
Figure 12:
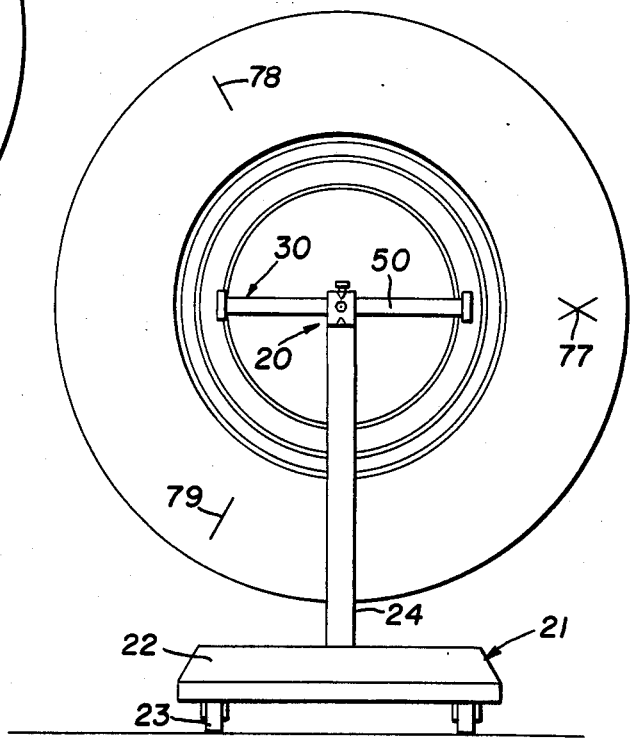
FIG. 12 depicts the wheel balancing apparatus in a third condition.

Referring now to FIGS. 10-12, the details of the manner in which the wheel balancing assembly 20 is utilized will be described. First, the wheel with the tire mounted thereon is removed from the vehicle and the shaft 26 attached. The shaft is then placed in the bearings 25 on the stand 21. The wheel is allowed to rotate freely so that the heavy spot can settle to the bottom. An "X" 77 is marked on the tire directly behind the post 24, as shown in FIG. 10.

Then the wheel balancer 30 is attached. The shaft end is located in the tubular extension 37. The bar 50 is rotated until it is perfectly vertical, that is, in line with the post 24, all as shown in FIG. 10. Then the thumb screw 40 is tightened. The sliding bar 50 is rotated in the body 35 so that the desired wheel size appears at the end of the label that is aligned with the window 41. This step could have been performed before mounting of the wheel balancer 30. Then the weight locating structure 70 is utilized. The bifurcated end 74 of the arm 73 is inserted over the neck down part of the headed stud 71, as shown in FIGS. 9 and 11. The arm is allowed to rest on the right-hand stop 72, whereby the arm forms an angle of 30° with the horizontal. A chalk mark 78 is placed on the wheel next to the end of the arm, as shown in FIG. 11. The arm 73 is pivoted about the headed stud 71 until it rests against the other stop 72, on the left as viewed in FIG. 9. A mark 79 is made on the wheel next to the end of the arm. The marks 78 and 79 are adjacent to the spots on the flange 12 wherein the weights will be placed to balance the wheel/tire combination. The weight locating structure 70 is then removed.

Now that the locations of the weights have been set, the magnitude of the weights to be mounted has to be determined. To that end, the wheel 11 is rotated so that the bar 50 is horizontal, as depicted in FIG. 12. The bar 50 is slid away from the heavy spot marked by the "X" 77. The bar is moved until the wheel remains stationary. Usually, the wheel is then rotated 180° to check the bar adjustment. The mechanic then notes the number that appears in the window 41.

Then the wheel balancer 30 is removed and the shaft detached. A weight equal to the amount read at the window indicator is placed at each of the marks 78 and 79.

While there has been described what is at present considered to be the preferred embodiment, and specifically certain compositions and dimensions have been set forth as preferred, it is understood that the invention is not intended to be limited thereby and that other embodiments, compositions and dimensions can be utilized. It is intended that the following claims define the legal scope of the invention.

What has been described therefore is a wheel balancer which is simple to use, is reliable in construction, and is relatively inexpensive to manufacture. The wheel balancer has a single arm which itself constitutes the movable weight and has indicia scales correlating the wheel size with the movable weight and the amount of unbalance.

I claim:

1. A wheel balancer for use in balancing a wheel to which the shaft is attached, said wheel balancer comprising a body, means on said body for mounting to the shaft, said body having a window, a bar including a plurality of longitudinally extending facets respectively corresponding to different wheel sizes and respectively having longitudinally spaced apart indicia thereon representing weights to be added to the wheel, said bar being slidably mounted in said body such that said indicia are visible through said window, said bar being rotatably mounted on said body to enable the indicia on a selected facet to be visible in said window, and detent means on said body and said bar to hold said bar at a selected orientation with respect to said body and to enable said bar to be slidable while in the selected orientation.

2. The wheel balancer of claim 1, wherein said detent means includes a plurality of longitudinally extending grooves respectively corresponding to said facets, and ball means on said body and biased toward said bar.

3. The wheel balancer of claim 2, wherein some of said grooves are part cylindrical in transverse cross section.

4. The wheel balancer of claim 1, and further comprising a plurality of elongated labels bearing said indicia, said labels being respectively attached to said facets.

5. A wheel balancer for use in balancing a wheel to which the shaft is attached, said wheel balancer comprising a body, and means on said body for mounting to the shaft, said body having a window, a bar including a plurality of longitudinally extending facets respectively corresponding to different wheel sizes and respectively having longitudinally spaced apart indicia thereon representing weights to be added to the wheel, said bar being slidably mounted in said body such that said indicia are visible through said window, said bar being rotatably mounted on said body to enable the indicia on a selected facet to be visible in said window, said body having an inwardly directed shoulder thereon defining a pair of abutment surfaces, said bar having a pair of longitudinally extending and radially directed walls for respectively engaging said abutment surfaces to limit the rotation of said bar in both directions.

6. A wheel balancer for use in balancing a wheel, said wheel balancer comprising a body, means on said body for mounting to the wheel, said body having a window, a bar including longitudinally spaced apart indicia representing weights to be added to the wheel, said bar being slidably mounted in said body such that said indicia are visible through said window, a cap at each end of said bar, and at least one shim between an end cap and the adjacent end of said bar.

7. A wheel balancer for use in balancing a wheel to which a shaft is attached, said wheel balancer comprising a body, means on said body for mounting to the shaft, said body having a window, a bar including a plurality of longitudinally extending facets respectively corresponding to different wheel sizes and respectively having longitudinally spaced apart indicia thereon representing weights to be added to the wheel, said bar being slidably mounted in said body such that said indicia are visible through said window, said bar being rotatably mounted on said body to enable the indicia on a selected facet to be visible in said window, detent means on said body and said bar to hold said bar at a selected orientation with respect to said body and to enable said bar to be slidable while in the selected orientation.

8. A wheel balancer for use in balancing a wheel, said wheel balancer comprising a body, means on said body for mounting to the wheel, said body having a window, a bar including longitudinally spaced apart indicia representing weights to be added to the wheel, said bar being slidably mounted in said body such that said indicia are visible through said window, a cap at each end of said bar, and means associated with an end cap for adjusting the position of said last-mentioned end cap.

9. A wheel balancer for use in balancing a wheel to which a shaft is attached, said wheel balancer comprising a body, means on said body for mounting to the shaft, said body having a window, and a single bar including a plurality of longitudinally extending facets respectively corresponding to different wheel sizes and respectively having longitudinally spaced apart indicia thereon representing weights to be added to the wheel, said bar being slidably mounted in said body such that said indicia are visible through said window, said bar being rotatably mounted on said body to enable the indicia on a selected facet to be visible in said window, said bar being rotatably positionable to be held at a selected orientation with respect to said body and to enable said bar to be slidable while in the selected orientation.

* * * * *